Patented July 5, 1938

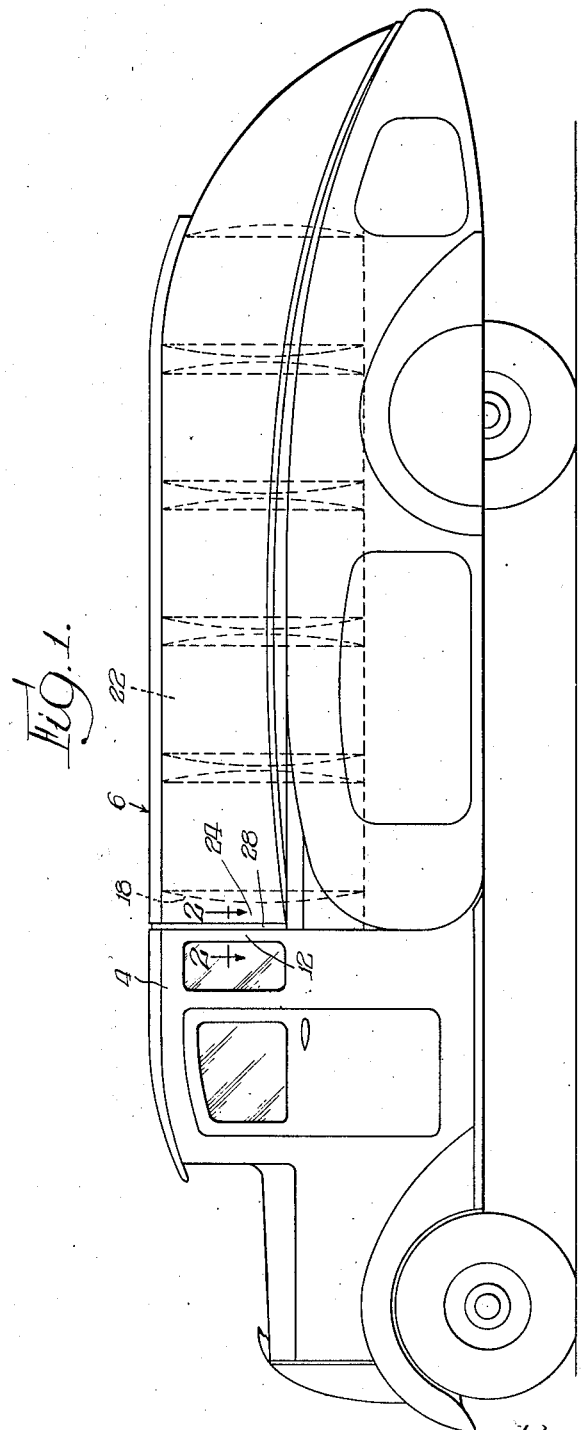

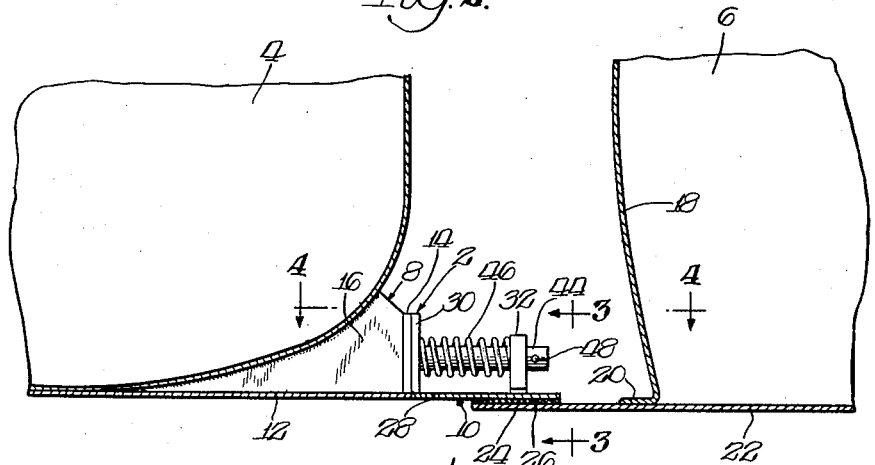

2,122,574

UNITED STATES PATENT OFFICE 2,122,574

TANK VEHICLE STRUCTURE AND THE LIKE

Ralph L. Kuss, Joliet, Ill., assignor to Farrell Manufacturing Company, Joliet, Ill., a corporation of Illinois Application August 6, 1936, Serial No. 94,514

15 Claims. (Cl. 280—5)

The present invention relates to tank vehicle structures and the like, and more particularly to a joint between the cab and tank of said vehicles.

Among the objects of the present invention is to provide a novel joint between the cab and its associated tank in a tank vehicle which is simple, yet of rigid and serviceable construction and easily assembled and constructed at low cost.

Heretofore a joint has been formed between a cab and tank of a tank vehicle by placing a strip of rubber or other resilient material at the back of the cab suitably located to cooperate with the tank which has been mounted a nominal distance away from the strip of rubber to allow for telescoping and lateral motion between the cab and the tank. This construction is unsatisfactory from the standpoint of lack of continuity between the tank and cab, and the strip of rubber or other similar material is subjected to continuous wear and deteriorates rapidly, thus eliminating the desired connection between the tank and cab.

The present invention threfore has as an object the idea of providing a novel joint between the cab and tank which will stand up under continuous wear and which provides continuity in construction of the cab and tank structures.

Still another object of the present invention is to provide a novel joint between the cab and tank of a tank vehicle which is adapted to provide a continuous metallic joint between the cab and tank without impairing the relative lateral or other motion between these two component parts of the tank vehicle.

Still another object of the present invention is to provide a novel joint between the cab and tank of a tank vehicle which is adapted to maintain continuous cooperative relation to provide a continuous metallic assembly between the cab and tank, yet accommodating the chassis frame deflection due to relative lateral motion between the cab and tank.

Still another object of the present invention is to provide novel cab structure in a tank vehicle which includes elements forming in part a joint between the cab and the vehicle tank.

Still a further object of the present invention is to provide a novel vehicle tank structure including means adapted to cooperate with structure forming in part a joint between the cab and tank.

Other objects, features, capabilities and advantages are comprehended by the invention, as will later appear and as are inherently possessed thereby.

Referring to the drawings:

Figure 1 is a view in side elevation of a vehicle incorporating an embodiment of the present invention;

Figure 2 is a fragmentary view in cross-section of a novel joint made in accordance with the present invention as incorporated in Figure 1 of the drawings and taken in the plane represented by line 2—2 therein;

Figure 3 is a fragmentary view in cross-section taken in the plane represented by line 3—3 of Figure 2 of the drawings; and Figure 4 is a fragmentary view in cross-section taken in the plane represented by line 4—4 of Figure 2 of the drawings.

Referring now more in detail to the drawings, a joint 2 made in accordance with the present invention is disclosed in association with a cab 4 and a tank 6 of a tank vehicle. As will be clearly understood, the cab 4 is mounted on the chassis immediately to the rear of the vehicle motor and serves as a housing for the operator of the vehicle, and that the tank 6 is also mounted on the chassis of the vehicle and serves to retain various fluids, such as gasoline or the like, which are being transported from place to place.

The joint 2 is provided to present a continuous metallic structure between the cab and tank and is formed to permit relative lateral motion between the cab and tank which results from chassis frame deflection or from other causes. This joint 2 has part 8 associated with the cab 4 and the part 10 associated with the vehicle tank 6. Part 8 comprises a sheathing 12 which is suitably connected to the cab, preferably by welding or the like, the same extending rearwardly from its connection to the cab and being provided with a bearing plate 14 extending inwardly on the rearward end thereof. In securing the sheathing 12 in place, the back of the cab is reworked so that the sheathing 12 is an integral part of the cab. The inwardly extending bearing member 14 conforms substantially to the contour of the tank, and the bearing plate and sheathing are firmly held in place by welding gusset plates or webs 16 to the cab, bearing member and sheathing, as disclosed in Figure 1 of the drawings. These gusset plates or webs may be spaced apart as desired and serve as reinforcing means to provide a rigid structure.

The tank 6 is provided with a head 18 secured as at 20 to a shell 22, the shell 22 in the particular tank construction disclosed extending forwardly of the head 18 as at 24 to provide a mounting for part 10 of the joint 2. Shell portion 22 has a sheet of fabric 26 riveted thereto and which is ground smooth to telescopically receive a false sheathing 28 which is mounted therein. This sheathing 28 is provided at its forward end with a bearing member 30 corresponding essentially to bearing member 14 and which is adapted to have cooperative bearing relation therewith. The telescopic arrangement of sheathing 28 of the shell portion 22 provides for relative movement between the cab and tank.

In order to maintain bearing relation between the bearing members 30 and 14, a plurality of abutment members 32 is secured in spaced relation to the shell portion 22. Each of these abutment members is of similar construction, and as disclosed in Figure 3 of the drawings, is of T-shape including the vertical portion 34 secured to the shell portion 22 as by welding or the like, and the laterally extending arms 36 and 38 spaced from said shell portion 22. The fabric 26 is cut away at each abutment member so as to fit around the same, while the sheathing 28 at each of the abutment members is notched as at 40 to permit relative telescopic movement of the same in respect to the shell portion 22. Each of the abutment members 32 is provided with an opening 42 adapted to receive a pin 44 which is journaled within the opening, the other end of the pin 44 being connected to the bearing member 30. Disposed between the bearing member 30 and the abutment 32 is a coil spring 46 normally urging the bearing member 30 into its cooperative bearing relation with bearing member 14. Outward movement of the sheathing 28 under the impulse of the coil springs 46 is limited as by means of cotter pins or the like 48 passing through each of the pins 44 adapted to cooperate with the abutments, limiting the outward movement thereof.

From the above description it will be quite apparent that the joint disclosed in the drawings provides continuity of structure between the cab and tank, presenting a continuous metal joint which is maintained irrespective of the relative movement between the cab and tank due to chassis frame deflection or from any other cause.

While I have herein described and upon the drawings shown an illustrative embodiment of the invention, it is to be understood that the invention is not limited thereto but may comprehend other constructions, arrangements of parts, details and features without departing from the spirit of the invention.

I claim:

1. In a tank vehicle, the combination of a vehicle structure comprising a cab, a second vehicle structure comprising a tank disposed adjacent thereto, and means providing a bearing joint between said structures extending at least around a portion of said tank, said joint having a part connected to one of said structures and provided with a bearing member and a part connected to the other of said structures and provided with a bearing member cooperating with said first-named bearing member, and means providing a movable connection between one of said parts and its associated structure.

2. In a tank vehicle, the combination of a vehicle structure comprising a cab, a second vehicle structure comprising a tank disposed adjacent thereto, and means providing a bearing joint between said structures extending at least around a portion of said tank, said joint having a part connected to one of said structures and provided with a bearing member and a part connected to the other of said structures and provided with a bearing member cooperating with said first-named bearing member, and means providing a movable connection between one of said parts and its associated structure, said means including resilient means for maintaining cooperative relation between said bearing members.

3. In a tank vehicle, the combination of a vehicle structure comprising a cab, a second vehicle structure comprising a tank disposed adjacent thereto, and means providing a bearing joint between said structures extending at least around a portion of said tank, said joint having a part connected to one of said structures and provided with a bearing member conforming substantially to the contour of said tank and a part connected to the other of said structures and provided with a bearing member cooperating with said first-named bearing member, and means providing a movable connection between one of said parts and its associated structure.

4. In a tank vehicle, the combination of a vehicle structure comprising a cab, a second vehicle structure comprising a tank disposed adjacent thereto, and means providing a bearing joint between said structures extending at least around a portion of said tank, said joint having a part connected to one of said structures and provided with a bearing member conforming substantially to the contour of said tank and a part connected to the other of said structures and provided with a bearing member cooperating with said first-named bearing member, and means providing a movable connection between one of said parts and its associated structure, said means including resilient means for maintaining cooperative relation between said bearing members.

5. In a tank vehicle, the combination of a cab having a rearwardly extending sheathing member, a tank disposed adjacent said cap and having a shell member disposed forwardly of the head thereof, and means forming a joint between said sheathing and shell, said joint being formed in part by a member conforming to the contour of said tank and connected to said sheathing and a member having bearing relation with said last-named member and connected to said shell, and means for adjustably positioning one of the members of said joint in respect to one of said first-named members to maintain said bearing relation between the members of said joint.

6. In a tank vehicle, the combination of a cab having a rearwardly extending sheathing member, a tank disposed adjacent said cab and having a shell member disposed forwardly of the head thereof, and means forming a joint between said sheathing and shell, said joint being formed in part by a member conforming to the contour of said tank and connected to said sheathing and a member having bearing relation with said last-named member and connected to said shell, and resilient means disposed between one of said first-named members and a member of said joint connected thereto for maintaining said bearing relation between the members of said joint.

7. In a tank vehicle, the combination of a cab having a rearwardly extending sheathing member, a tank disposed adjacent said cab and having a shell member disposed forwardly of the head thereof, a bearing member fixed to one of said first-named members, and a sheathing member telescopically arranged and mounted with respect to the other of said first-named members, said last-named sheathing member having a bearing member cooperating with said first-named bearing member.

8. In a tank vehicle, the combination of a cab having a rearwardly extending sheathing member, a tank disposed adjacent said cab and having a shell member disposed forwardly of the head thereof, a bearing member fixed to one of said first-named members, a sheathing member telescopically arranged with respect to the other of said first-named members and having a bearing member adapted to cooperate with said first-named bearing member, and resilient means disposed between said last-named sheathing member and the other of said first-named members to maintain said cooperative relation between said bearing members.

9. In a tank vehicle, the combination of a cab having a rearwardly extending sheathing, a tank disposed adjacent said cab comprising a shell and a head, said shell extending forwardly of said head, said sheathing being provided with a bearing member extending inwardly from said sheathing and conforming substantially to the contour of said tank, a sheathing telescopically arranged with respect to said tank shell and having an inwardly extending bearing member adapted to have bearing relation with said first-named bearing member, abutment means on said shell, and resilient means between said abutment means and the bearing member of said telescopically arranged sheathing member for maintaining said bearing members in cooperative relation.

10. In a tank vehicle, the combination of a cab having a rearwardly extending sheathing, reinforcing members disposed between said sheathing and cab, a tank disposed adjacent said cab comprising a shell and a head, said shell extending forwardly of said head, said sheathing being provided with a bearing member extending inwardly from said sheathing and being connected to said reinforcing members and conforming substantially to the contour of said tank, a sheathing telescopically arranged with respect to said tank shell and having an inwardly extending bearing member adapted to cooperate with said first-named bearing member, a plurality of abutments extending inwardly from said shell provided with openings, pilot pins secured to said last-named bearing member opposite said abutments and movably supported in said openings, and coil springs disposed about said pins and between said abutment and last-named bearing member for maintaining said bearing members in cooperative relation yet permitting relative movement of said tank and cab.

11. In a vehicle, the combination of a vehicle structure element, a second vehicle structure element disposed adjacent thereto, and means providing a bearing joint between said structure elements extending at least around a portion of said structure elements, said joint having a part connected to one of said structure elements and provided with a bearing member and a part connected to the other of said structure elements and provided with a bearing member cooperating with said first-named bearing member, and means providing a movable connection between one of said parts and its associated structure element.

12. In a vehicle, the combination of a vehicle structure element, a second vehicle structure element disposed adjacent thereto, and means providing a bearing joint between said structure elements extending at least around a portion of said structure elements, said joint having a part connected to one of said structure elements and provided with a bearing member and a part connected to the other of said structure elements and provided with a bearing member cooperating with said first-named bearing member, and means providing a movable connection between one of said parts and its associated structure element, said means including resilient means for maintaining cooperative relation between said bearing members.

13. In a vehicle, the combination of a vehicle structure element, a second vehicle structure element disposed adjacent thereto, and means providing a bearing joint between said structure elements extending at least around a portion of said structure elements, said joint having a part connected to one of said structure elements and provided with a bearing member and a part connected to the other of said structure elements and provided with a bearing member cooperating with said first-named bearing member, and means for adjustably positioning one of said parts with respect to its associated structure element to maintain said bearing relation between said bearing members.

14. In a vehicle, the combination of a cab, rearwardly extending sheathing connected to said cab and at one side thereof, and a bearing member extending inwardly from adjacent the rear edge of said sheathing and adapted to cooperate with a joint forming member of an adjacently disposed vehicle structure member.

15. In a vehicle tank, the combination of a shell, a head, said shell extending beyond said head, and a joint forming member mounted upon said extension and movably supported in relation to said shell and extending at least around a portion of said tank and adapted to cooperate with a joint forming member of an adjacently disposed vehicle structure member.

RALPH L. KUSS.